United States Patent [19]
Bonnett

[11] Patent Number: 5,551,813
[45] Date of Patent: * Sep. 3, 1996

[54] MACHINING CENTRE AND ROUTER GUARD

[75] Inventor: John Bonnett, Middlesex, United Kingdom

[73] Assignee: Black & Decker Inc., Newark, Del.

[ * ] Notice: The term of this patent shall not extend beyond the expiration date of Pat. No. 5,429,162.

[21] Appl. No.: 206,295

[22] Filed: Mar. 4, 1994

[30]   Foreign Application Priority Data

May 5, 1993 [GB] United Kingdom ............... 9304639

[51] Int. Cl.⁶ ........................... B23Q 11/02; B27G 19/00
[52] U.S. Cl. ..................... 409/134; 144/251.2; 408/710; 409/137
[58] Field of Search .................... 409/80, 137, 134, 409/132, 202, 190, 182, 178, 175; 144/251 A, 251 B, 252 R; 451/451, 456; 408/241 G, 710

[56]   References Cited

U.S. PATENT DOCUMENTS

| | | | |
|---|---|---|---|
| 2,305,895 | 12/1942 | Pearson | 408/710 |
| 3,581,787 | 8/1969 | Bane | 409/178 X |
| 3,880,047 | 4/1975 | Dosier . | |
| 4,382,728 | 5/1983 | Anderson . | |
| 4,468,160 | 8/1984 | Campbell, Jr. | 409/202 |
| 4,484,608 | 11/1984 | Ferdinand . | |
| 4,514,122 | 4/1985 | Campbell | 409/190 |
| 4,606,685 | 8/1986 | Maier | 409/182 |
| 4,770,573 | 9/1988 | Monobe | 409/182 |
| 4,822,219 | 4/1989 | Wood et al. | 409/137 |
| 4,830,555 | 5/1989 | Conachen . | |
| 5,031,678 | 7/1991 | Remmele et al. | 144/252 R |
| 5,100,270 | 3/1992 | Dowdle et al. | 409/132 |
| 5,429,162 | 7/1995 | Bonnett | 144/251 A |

FOREIGN PATENT DOCUMENTS

| | | | |
|---|---|---|---|
| 0191509 | 8/1986 | European Pat. Off. . | |
| 465857 | 2/1914 | France | 144/251 A |
| 2436023 | 2/1976 | Germany | 408/710 |
| 3303734 | 8/1984 | Germany . | |
| 3518755 | 11/1986 | Germany | 408/241 G |
| 3734127 | 4/1989 | Germany | 409/137 |
| 664751 | 1/1952 | United Kingdom | 408/241 G |
| 8401320 | 4/1984 | WIPO . | |

OTHER PUBLICATIONS

"Drilling Machines: Guarding of Spindles and Attachments" p. 18, FIG. 13 Dated Jun. 1, 1978.

Primary Examiner—William Briggs
Attorney, Agent, or Firm—Charles E. Yocum; Dennis A. Dearing; Frederick H. Voss

[57]   ABSTRACT

A processing machine comprises at least three powered guides (13,15,27) for movement along Cartesian axes for a support (12) to hold a tool (21) on a horizontal table (11). Motors (14,16,19) for movement along the three guides are connected to an integrated control device in the machine comprising a microprocessor sending to the motors movement signals reading data for position and moving from memories connected thereto. To the microprocessor are also connected a keyboard (130) for sending command signals and means (131) for display of operating information. The tool 21 is a router having its base (70) still attached so that a dust hood (76) incorporated in the base may be employed for dust extraction. A router (21) has a base (70) joined to a body (60) by columns (62,64), the latter being slidable in sleeves (66) in the body (60). A spring (90) between the base (70) and the body of the router serves as a guard for the router bit (76).

17 Claims, 5 Drawing Sheets

MACHINING CENTRE AND ROUTER GUARD

BACKGROUND OF THE INVENTION

This invention relates to machining centres and guard for routers for for such a machine.

A machining centre usually comprises a work table on which a processing tool, for example, a router or milling cutter, moves along three Cartesian axes. The centre may be controlled by a computer, e.g. a personal computer, in which must be first installed a processing program. A vertical guide supports a first carriage which runs along the guide by means of a first motor. The tool is fixed to the first carriage. The vertical guide is supported by a second carriage, running by means of a second motor along a first horizontal guide which is supported at one end by a third carriage running by means of a third motor along a second horizontal guide. The second horizontal guide is arranged at a right angle to the first horizontal guide, and the support moves along the three Cartesian axes over the horizontal work table. The three motors are connected to the computer, which may be integrated in the machine and may comprise a microprocessor sending to the motors signals for movement by reading position and movement data from memories connected thereto.

In stationery machinery, such as the type to which the present invention relates, and where the tool is any milling tool, it maybe provided with guarding in order to protect operators from inadvertently contacting the tool bit and possibly injuring themselves.

Moreover, it is highly desirable to provide dust extraction facilities, so that the environment around the center can be kept clean and dust free. Hitherto, it has been the practice to surround the cutter of the tool with a depending curtain of brush, the interior of which is supplied with vacuum from a dust extraction device. Such an arrangement suffers a number of disadvantages, namely that the curtain shrouds the tool bit so that the cutter cannot be viewed by the operator, and secondly, at the maximum depth of cut, the brush is often so distorted by its contact with the workpiece that gaps appear which reduce the effectiveness of the extraction.

Consequently, it is an object of the present invention to provide a machining center which overcomes these disadvantages, or at least mitigates their effects. In accordance with this invention, there is provided a machining center comprising a tool mounted in a frame for movement along three Cartesian axes, in which the tool is a router comprising a body fixed to the frame and which body houses a motor driving a rotary tool bit depending from said body, at least one column being slidable with respect to said body along an axis parallel the rotation axis of said bit and mounting a router base having an aperture through which said tool is adapted to plunge to perform cutting operations, said base comprising a hood having openings towards said bit and leading to a dust extraction port for connection to a vacuum source.

BRIEF DESCRIPTION OF THE INVENTION

Thus the present invention provides that a machining center can employ a conventional router which not only has the benefit that special equipment is not required, but also that the presently available dust extraction facilities which are commonly provided for handheld routers are also perfectly satisfactory in a machining center, event though the base of the router is not required in its usual role. Nevertheless, the base does not impede operation of machining center, except perhaps when the base slips over an edge in the workpiece to a lower level, and in which event will require manual lifting in order to return to the higher level. However this is not anticipated as being a frequent problem.

Also in accordance with the present invention, there is provided a guard for a router comprising a body which houses a motor driving a rotary tool bit depending from said body, at least one column being slidable with respect to said body along an axis parallel the rotation axis of said bit and mounting a router base having an aperture through which said tool is adapted to plunge to perform cutting operations, the guard comprising a coil spring between said base and body and surrounding said bit axis.

Needless to say, to be effective, the spring should have a pitch when fully extended which is insufficient to permit easy insertion of a standard finger between adjacent turns of the spring. Preferably, said spring is employed as the return spring for said base, and serves to bias the base and body apart.

This aspect of the present invention has particular application in the machining center described above.

BRIEF DESCRIPTION OF THE DRAWINGS

To further clarify the explanation of the innovative principles of the present invention and its advantages as compared with the known art there is described below with the aid of the annexed drawings a possible embodiment as nonlimiting examples applying said principles.

In the drawings:

FIG. 1b shows a fragmentary view, partly in section along the line II—II in FIG. 1a;

FIG. 1c is a section on the line III—III in FIG. 1a;

DETAILED DESCRIPTION OF THE DRAWINGS AND EMBODIMENT

Figure 1A:
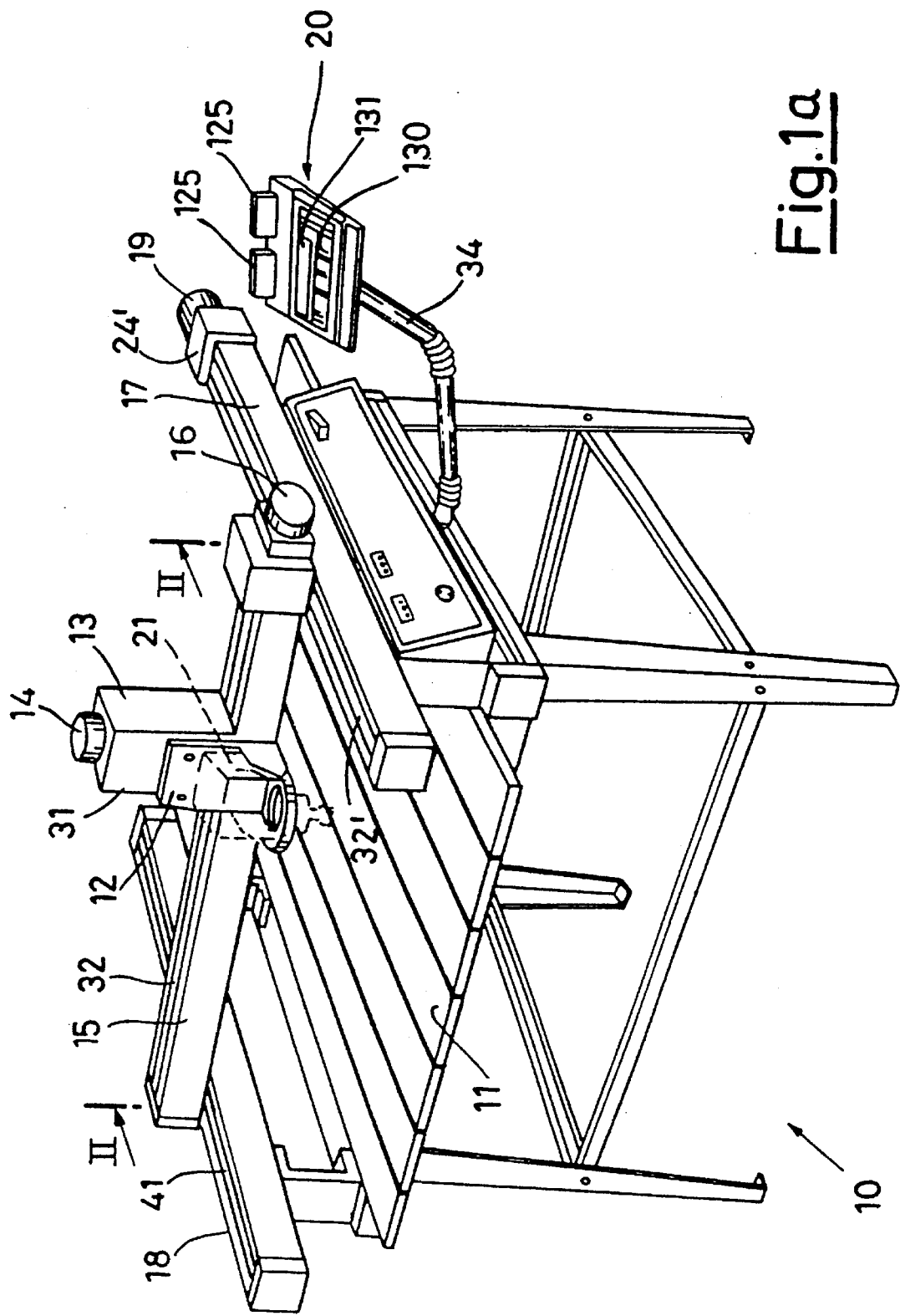
FIG. 1a shows schematically a perspective view of a machining center of the type to which the present invention relates.

With reference to the drawings, FIG. 1a shows a machining center indicated generally by reference number 10, comprising a work table 11 on which is present a support 12 moved vertically along a first guide 13 powered by a first motor 14 or Z axis motor. The vertical guide 13 is in turn movable along a horizontal guide 15 by means of a second motor 16 or X axis motor.

The guide 15 is supported at the ends by two guides 17,18 arranged horizontally at right angles thereto. The guide 15 is thus movable horizontally along said guides 17,18 by means of a third motor 19 or Y axis motor.

The motors 14,16,19 are operated by an electronic circuit having a control panel or module 20, supported in a container at the end of a jointed arm 34 which can also constitute internally a passage for the electrical connections.

The support 12 receives an electric tool of the known art and therefore not further described nor shown, such as for example a mill or router, drawn in broken lines and indicated in FIG. 1a by reference number 21. To this end the support can include known complementary couplings with couplers in the tool.

Figure 1B:
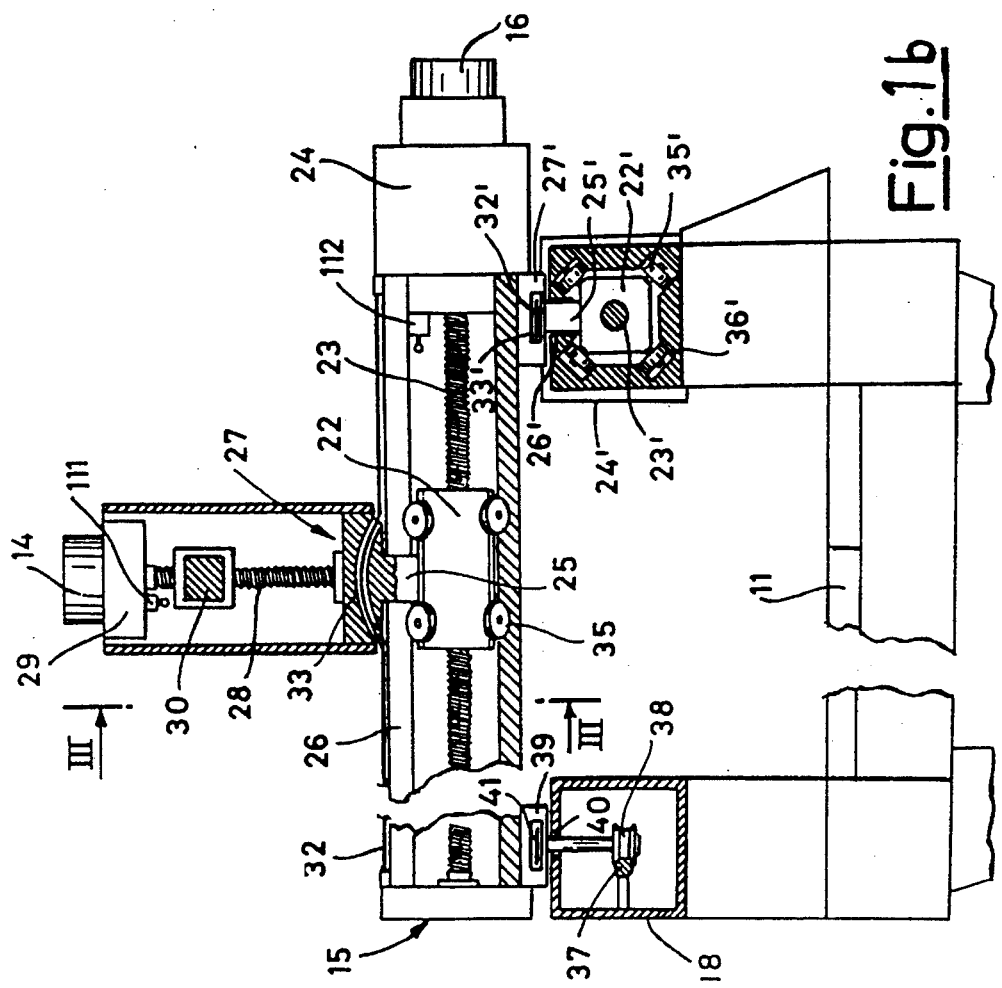

In FIG. 1b is shown schematically a cross section of the device 10 taken along the guide 15. As may be seen in said figure, the guide 15 is made from a boxed section in which runs a carriage 22 moved by a screw 23 operated by the motor 16 through a speed reducer 24. The carriage 22 has a part 25 projecting from the guide through a longitudinal slot 26 to terminate with a supporting end 27 to which is fixed the vertical guide 13. The guide 13, also provided in boxed form comprises a screw 28 moved by the motor 14 through a speed reducer 29. On the screw 28 runs a nut screw carriage 30 to which is fixed through a groove 31 (FIG. 1a) the support 12 for the tool. To prevent penetration of dust or processing chips inside the guide 15, the slot 26 is closed by a flexible strip 32 which is raised and moved away from the slot only opposite the end of the support 27 to pass through a passage 33 therein. In this manner the part 25 can project from the slot 26, elsewhere closed by the strip 32.

Figure 1C:
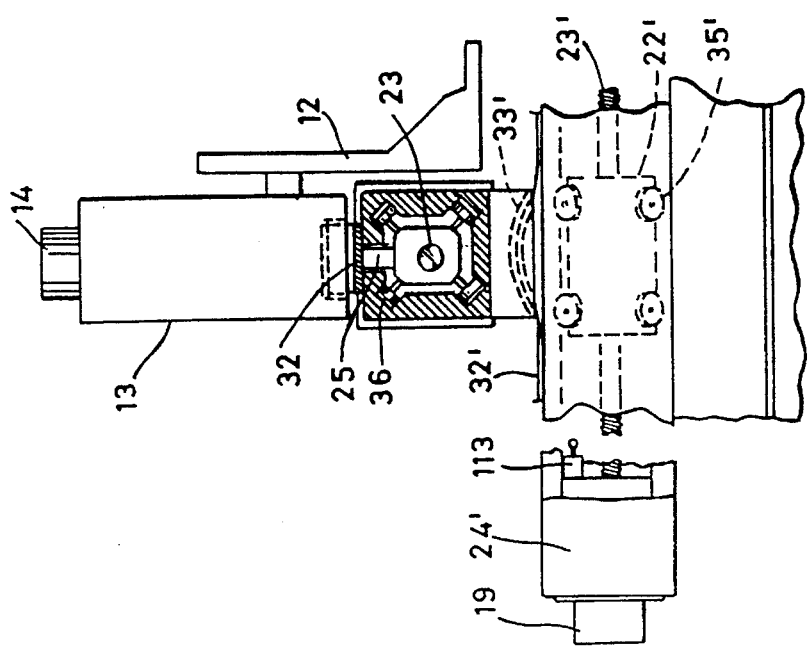

As may be seen in FIG. 1c, the carriage 22 has roller bearings 35 for guided running along complementary grooves 36 inside the guide 15.

The guide 17 is substantially identical to the above described guide 15. For this reason the analogous elements will be indicated below with the same numbering used above but with the addition of the suffix "prime".

As may be well seen in FIGS. 1b and 1c the guide 17 is provided with a boxed section in which runs a carriage 22' moved by a screw 23' operated by the motor 19 through a speed reducer 24'. The carriage 22' has roller bearings 35' for guided running along complementary longitudinal grooves 36' inside the guide 17. In addition, the carriage 22' has a part 25' projecting from the guide through a longitudinal slot 26' to terminate with a supporting end 27' to which is fixed one end of the horizontal guide 15.

To prevent penetration of dust or processing chips into the guide 17 the slot 26' is closed by a flexible strip 32' passing through a passage 33' in the supporting end 27'.

As may be well seen in FIG. 1b, the guide 18 is provided merely with a boxed section in which is arranged a track 37 on which runs an idling wheel 38 supported on the guide 15 by means of a support 39 projecting from the guide 18 through a longitudinal groove 40, also advantageously closed by a protective strip 41 through the support 39 to allow sliding movement, similarly to what was described for the guides 15 and 17.

It is now clear how, by appropriate control of the motors 14,16,19 a tool positioned on the support 12 can be moved to any point on the table 11 and can be brought near to, or be withdrawn from, the table.

Figure 2:
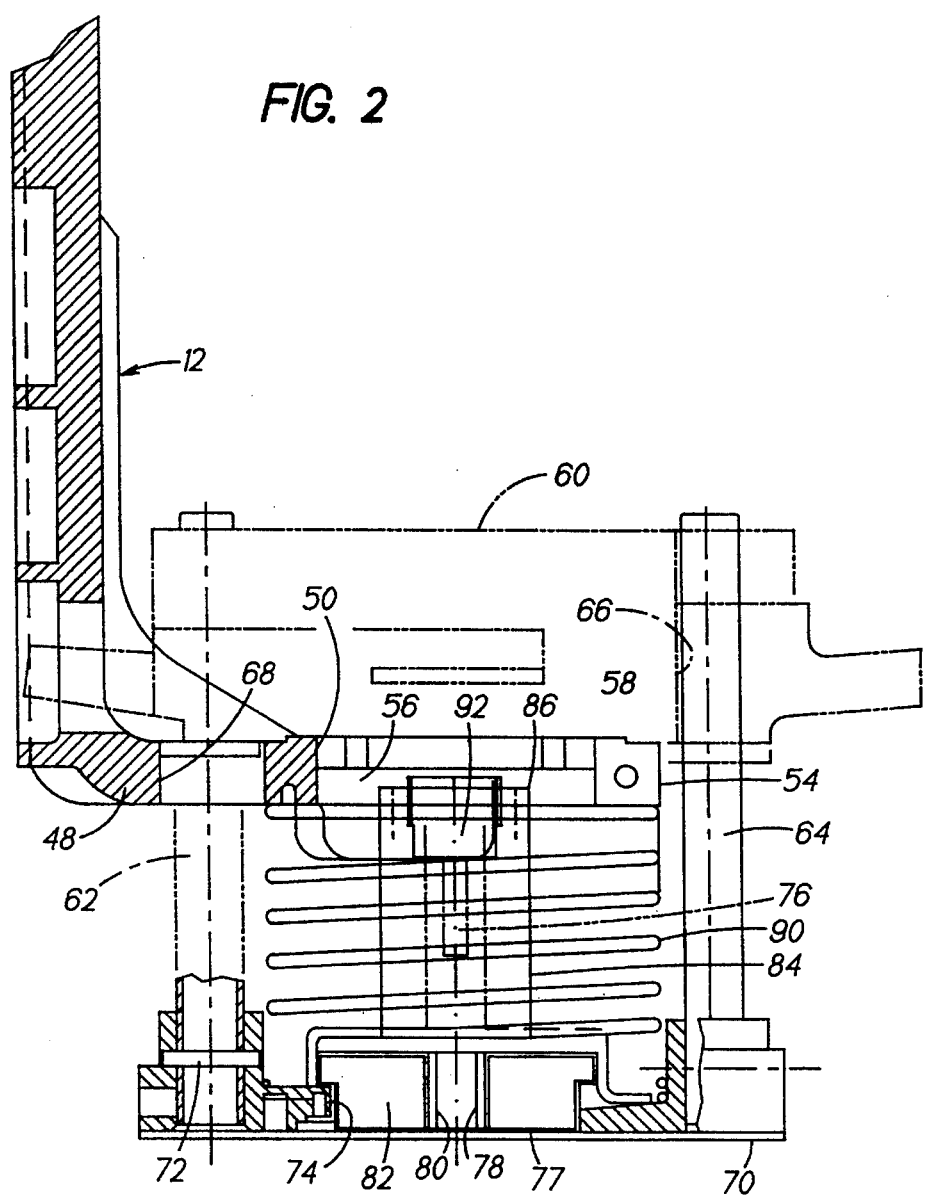
FIG. 2 shows a fragmentary view partially cross sectioned of a first carriage of a machining center according to the present invention.
Figure 3:
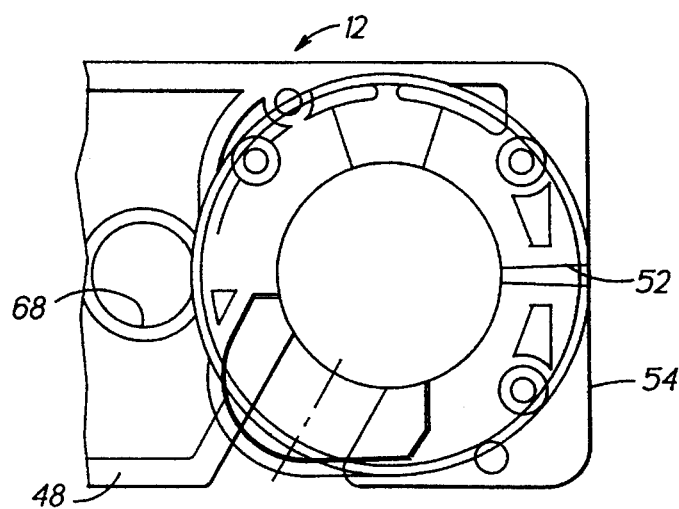
FIG. 3 shows an underneath view of the carriage of FIG. 2.
Figure 4A:
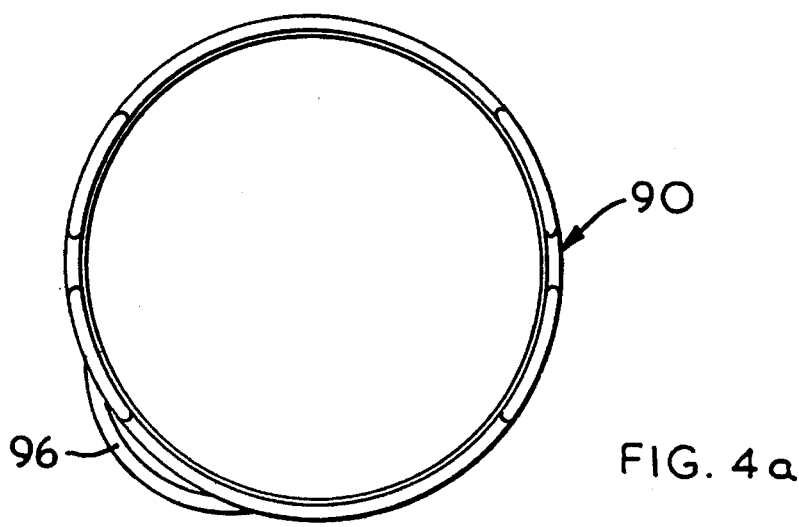
FIGS. 4a to e show different views of a spring guard according to the present invention, 4a being a view in the direction of Arrow a in FIG. 4b, 4b being a side view, partly sectioned along the line b—b in FIG. 4e, 4c being a view in the direction of Arrow c in FIG. 4b, 4d being a side view, partly sectioned along the line b—b in FIG. 4e, and 4e being a section on the line e—e in FIG. 4d.
Figure 4B:
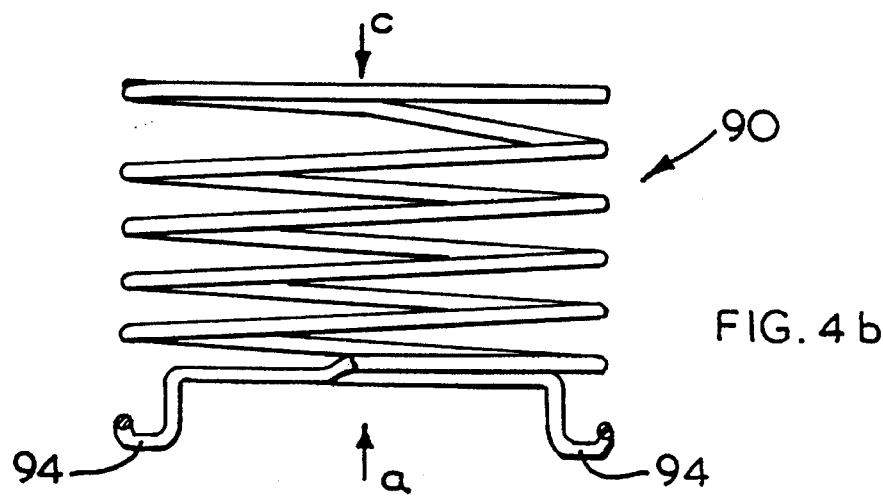
Figure 4C:
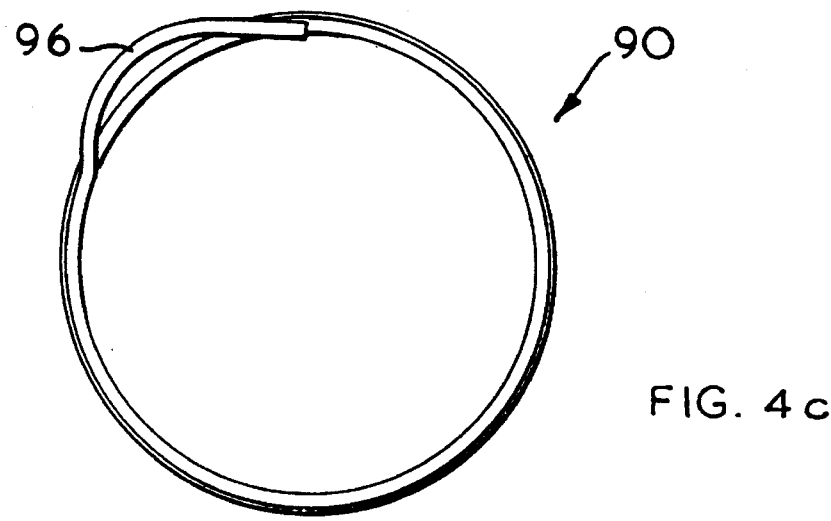
Figure 4D:
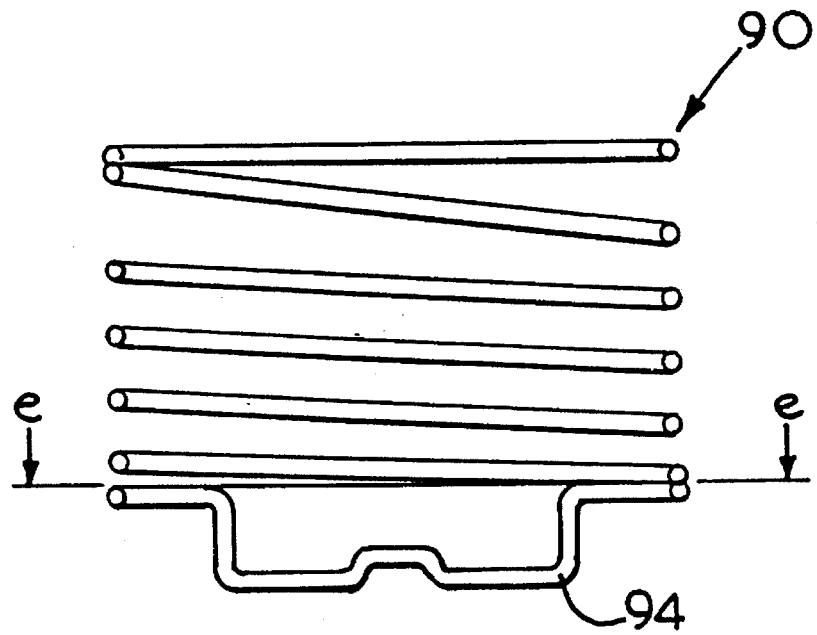
Figure 4E:
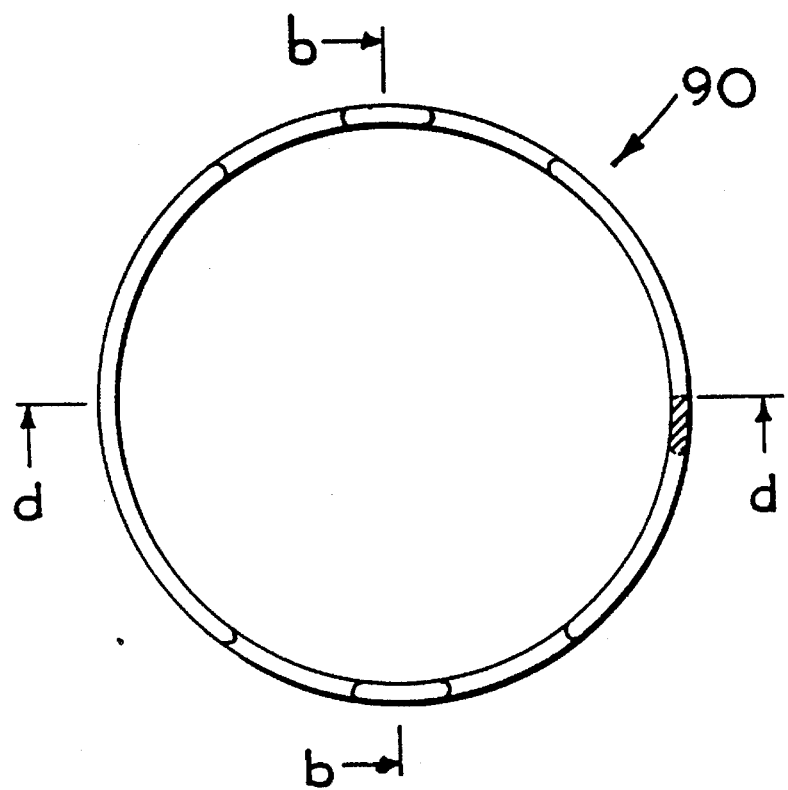

Turning now to FIGS. 2 and 3, the carriage 12 comprises an L-shaped bracket in whose horizontal limb 48 is formed a central aperture 50 which has a slot 52 joining the aperture to front end 54 of the bracket 12. Aperture 50 is adapted to receive nose 56 of a router 60 (not fully shown). A screw and bolt (not shown) are adapted to be received in cross bore 58 so as to clamp the nose 56 in the aperture 50.

The router 60 has two columns 62,64 which are a sliding fit in sleeves 66 in the body of the router 60. Front column 64 is outside the limb 48 of the bracket 12. Rear column 62 is received, however, through a hole 68 in the limb 48 behind the aperture 50. The columns 62,64 mount a router base 70, and are secured therein by pins 72 passing through bores in the base 70 and columns 62,64. The base 70 has a large central aperture 74, through which a cutter 76, received in the body 60 of the router, is adapted to pass before performing cutting operations on a workpiece below the base 70. The aperture 74 mounts a dust hood 77 which is known per se and is shown only in brief in the drawings. It, too, has a central aperture 78 through which the bit 76 passes, and in the wall of aperture 78, there are formed openings 80 facing the interior of the aperture and which openings lead to a passage 82 in the hood and around the aperture 78 and which ultimately converge on a dust port 84.

A vacuum hose (not shown) is adapted to be secured over the end 86 of the port 84 so that vacuum is applied to the aperture 78. Thus dust generated by the tool 76 cutting a workpiece lying against the base 70, at the lower end of aperture 78, is effectively removed. The hood 77 is conveniently constructed from transparent plastics material so that it does not significantly obstruct an operator's view of the workpiece through the aperture 74, and the cutter 76 doing its job.

It is a requirement of stationery machinery that its moving parts, at the cutting tools, be adequately guarded. The fact that the base 70 is employed in the present invention, provides an opportunity to arrange an effective guard. Here, a compressible resilient router guard or spring 90 is formed between the base 70 and the body 60 of the router. In fact, the spring abuts the underside of the limb 48, rather than the body 60 of the router.

The spring 90 has sufficiently tight coils so that the gap between them is insufficient to receive a "standard" finger, and is sufficiently strong that the finger cannot prise the coils apart using a "standard" pressure. On the other hand, the coils must not be so tight that, either they become coil bound when the router is lowered against a workpiece and so that the cutter 76 does not protrude sufficiently below the base 70, or so that they obscure the operator's view of the cutting operation proceeding.

Moreover, the spring 90 can replace the normal return springs for the columns 62,64, which can therefore be dispensed with. In this respect, it is even to be noted that the spring 90 in no way obstructs access to the collet 92 of the router, and which must be loosened, usually with a spanner, in order to change the cutter 76. The spanner can easily slip between adjacent coils of the spring 90.

FIGS. 4 a to e show the spring in several different views. At its lower end, the spring has downwardly depending legs 94, which fit in recesses formed in the base 70. At the top end it has a bulge 96.

What is claimed is:

1. A machining center for maneuvering a rotary tool over a work table to perform operations on a workpiece, comprising:

a tool bit attached to said rotary tool;

a support for supporting said rotary tool;

at least one column slidingly attached to said rotary tool and movable toward the workpiece;

a base mounted to said at least one column;

a compressible spring positioned between and connected to said base and said support and co-axial with said bit;

an aperture formed in said base for receiving said bit of said rotary tool; and a dust hood attached to said aperture for removing dust from the operations of said bit on the workpiece, and said dust hood is made of a transparent material such that the view of said bit operating on the workpiece is not obstructed.

2. A machining center as claimed in claim 1 wherein, said spring is compressed when said bit plunges through said base aperture before contacting the workpiece.

3. A machining center as claimed in claim 1, further comprising:

a wall defining a dust hood aperture in said dust hood and co-axial with said bit;

at least one opening in said wall of said dust hood aperture to permit dust removal;

a dust passage which communicates with said dust hood aperture via said at least one opening;

a dust port connected to said dust passage; and a vacuum source connected to said dust port to provide a force to remove the dust.

4. A machining center as claimed in claim 3, wherein:

when said bit is lowered to contact the workpiece said spring is compressed, and said bit plunges through and is immediately surrounded by said dust hood aperture, whereby dust caused by contact of said bit and the workpiece is removed.

5. A machining center as claimed in claim 1, wherein:

said spring coils have sufficient strength to maintain a space between said coils such that the view of said bit operating on the workpiece is not obstructed, and said spring further acts like a guard inhibiting inadvertent contact with said bit.

6. A machining center as claimed in claim 1, wherein:

said spring is normally biased to separate said rotary tool and said base.

7. A machining center as claimed in claim 1; wherein, two columns are slidingly attached to said rotary tool, and said two columns depend downward to mount said base.

8. A machining center as claimed in claim 7, wherein:

said base defines two bore holes;

and further comprising two pins securing two columns to said base via said bore holes.

9. A machining center as claimed in claim 1, wherein said rotary tool is a router.

10. A router comprising:

a body;

a rotary tool bit depending from said body;

at least one column slidingly attached to said body and parallel to said bit;

a base mounted to said at least one column;

an aperture formed in said base for receiving said bit prior to performing router operations;

a dust hood connected to said aperture;

a dust hood aperture defined by a wall and formed in said dust hood;

a dust passage surrounding said dust hood aperture and located within said dust hood;

at least one opening communicating said dust hood aperture to said dust passage to permit dust removal;

a dust port operably associated with a vacuum source and connected to said dust passage, such that, dust is removed via said dust hood aperture through said at least one opening into said dust passage and from said dust passage into said dust port for final removal; and a compressible spring located between and connected to said body and said base and co-axial to said bit, such that, when said spring is compressed said bit plunges through the aperture and said bit is surrounded by said dust hood.

11. A router as claimed in claim 10, wherein, there are two columns slidingly attached to said body and mounted to said base.

12. A router as claimed in claim 11, further comprising:

at least two bore holes defined in said base; and at least two pins which fit into said at least two bore holes for securing two columns to said base.

13. A router as claimed in claim 10, wherein;

said dust hood is constructed of a transparent material.

14. A machining center for maneuvering a router, comprising:

a tool bit attached to said router;

a support for supporting said router;

an aperture formed in the support for receiving said router;

at least one column slidingly attached to said router which depends downward toward the workpiece;

a base mounted to said at least one column such that said base can move relative to said router and the workpiece contacts an underside of the base;

a base aperture formed in said base for receiving said bit of said router before said bit operates on a workpiece;

a transparent dust hood attached to said base aperture for removing dust from the operations of said bit on the workpiece;

a compressible resilient router guard positioned between and connected to said base and said support; wherein said router guard is co-axial with said bit and can be seen through such that said router guard does not obstruct the view of said bit while compressed.

15. A machining center as claimed in claim 14, wherein said router guard is a compressible spring with spring coils of sufficient strength to maintain a space between said coils such that the view of said bit operating on the workpiece is not obstructed.

16. A machining center as claimed in claim 15, further comprising:

a dust hood aperture defined by a wall and formed in said dust hood and co-axial with said bit;

at least one opening in said dust hood aperture's wall to permit dust removal;

a dust passage which communicates with said dust hood aperture via said at least one opening;

a dust port connected to said dust passage; and a vacuum source connected to said dust port to provide a force to remove the dust.

17. A machining center as claimed in claim 16, wherein;

when said bit is lowered to contact the workpiece said spring is compressed, and said bit plunges through and is immediately surrounded by said dust hood aperture, whereby dust caused by contact of said bit and the workpiece is removed.

* * * * *